US011005957B2

(12) United States Patent
Horen (10) Patent No.: US 11,005,957 B2
(45) Date of Patent: May 11, 2021

(54) DISTRIBUTED GENERATION OF LIVE FEED UPDATES IN A SOCIAL NETWORKING SYSTEM

(71) Applicant: salesforce.com, inc., San Francisco, CA (US)

(72) Inventor: Gary Horen, Seattle, WA (US)

(73) Assignee: salesforce.com, inc., San Francisco, CA (US)

( * ) Notice: Subject to any disclaimer, the term of this patent is extended or adjusted under 35 U.S.C. 154(b) by 208 days.

(21) Appl. No.: 15/721,598

(22) Filed: Sep. 29, 2017

(65) Prior Publication Data

US 2019/0104189 A1    Apr. 4, 2019

(51) Int. Cl.
| | | |
|---|---|---|
| *H04L 29/08* | (2006.01) | |
| *H04L 29/06* | (2006.01) | |
| *G06F 16/951* | (2019.01) | |
| *G06Q 50/00* | (2012.01) | |
| *G06F 16/2453* | (2019.01) | |
| *G06F 3/0484* | (2013.01) | |

(52) U.S. Cl.
CPC ........ *H04L 67/26* (2013.01); *G06F 16/24544* (2019.01); *G06F 16/951* (2019.01); *G06Q 50/01* (2013.01); *H04L 67/10* (2013.01); *H04L 67/42* (2013.01); *G06F 3/04842* (2013.01)

(58) Field of Classification Search
CPC ......... H04L 67/26; H04L 67/10; H04L 67/42; G06F 16/951; G06Q 50/01
USPC ........................................................ 709/219
See application file for complete search history.

(56) References Cited

U.S. PATENT DOCUMENTS

| | | | | |
|---|---|---|---|---|
| 8,307,110 B1 * | 11/2012 | Katzer | ................ | H04L 12/1859 709/232 |
| 9,483,528 B1 * | 11/2016 | Gilbert | ................ | G06F 16/9535 |
| 2011/0066715 A1 * | 3/2011 | Schieder | ................ | H04L 67/04 709/223 |

(Continued)

FOREIGN PATENT DOCUMENTS

JP    2018018550 A    2/2018

OTHER PUBLICATIONS

Joseph M. Hellerstein et al., "Architecture of a Database System," Foundations and Trends in Databases, vol. 1, No. 2, 2007, pp. 141-259.

(Continued)

*Primary Examiner* — Meng Vang
(74) *Attorney, Agent, or Firm* — Nicholson De Vos Webster & Elliott LLP (57) ABSTRACT

Each user from the users of the social networking system accesses the social networking system through a client device coupled with one of the servers on which the social networking system is implemented. In response to an occurrence of an information update, a first server from the multiple servers, transmits a representation of the information update to each one of other servers from the multiple servers; a second server from the other servers determines a set of active feeds associated with one or more active users that are connected to the social networking service through the second server; and for each active feed from the set of active feeds, the social networking system updates a view of the active feed to include the information update.

15 Claims, 7 Drawing Sheets

(56) References Cited

U.S. PATENT DOCUMENTS

| | | | |
|---|---|---|---|
| 2014/0129661 A1* | 5/2014 | Thyagaraja | G06F 9/542 |
| | | | 709/207 |
| 2014/0280134 A1 | 9/2014 | Horen et al. | |
| 2014/0280329 A1 | 9/2014 | Beechuk et al. | |
| 2014/0280480 A1* | 9/2014 | Kazerani | H04L 67/2823 |
| | | | 709/203 |
| 2015/0281307 A1* | 10/2015 | Hartwell | H04L 65/604 |
| | | | 709/219 |
| 2016/0034437 A1* | 2/2016 | Yong | G06Q 30/0241 |
| | | | 715/202 |
| 2016/0191399 A1* | 6/2016 | Suri | H04L 43/0882 |
| | | | 709/219 |
| 2018/0357285 A1 | 12/2018 | Horen | |
| 2019/0102467 A1 | 4/2019 | Horen et al. | |
| 2019/0104189 A1 | 4/2019 | Horen | |
| 2019/0163784 A1 | 5/2019 | Horen | |

OTHER PUBLICATIONS

Joseph M. Hellerstein et al., "Anatomy of a Database System," Readings in Database Systems, Fourth Edition, The MIT Press, 2005, pp. 42-95.

Jan Van Den Bussche et al., "Translating SQL into the Relational Algebra," retrieved from: https://cs.ulb.ac.be/public/_media/teaching/infoh417/sql2alg_eng.pdf, 2009, pp. 1-19.

Michael Kifer et al., "Database Systems: An Application-Oriented Approach," Complete Version, Second Edition, Pearson Addison Wesley, ISBN-13: 978-0321268457, Mar. 26, 2005, parts 1-6 (1,245 pages).

* cited by examiner

DETERMINE, AT A SECOND SERVER FROM THE OTHER SERVERS, A SET OF ACTIVE FEEDS THAT ARE TO INCLUDE THE INFORMATION UPDATE, WHERE THE SET OF ACTIVE FEEDS ARE ASSOCIATED WITH ONE OR MORE ACTIVE USERS THAT ARE CONNECTED TO THE SOCIAL NETWORKING SYSTEM THROUGH THE SECOND SERVER, WHERE EACH ONE OF THE ACTIVE FEEDS INCLUDES AN AGGREGATION OF TWO OR MORE FEEDS
206

DETERMINE A QUERY PLAN TO BE PROCESSED AT A DATABASE SYSTEM FOR OBTAINING THE SET OF ACTIVE FEEDS
300

DETERMINE THE ACTIVE USERS THAT ARE CONNECTED TO THE SOCIAL NETWORKING SYSTEM THROUGH THE SECOND SERVER
302

DETERMINE BASED ON THE ACTIVE USERS THAT ARE CONNECTED TO THE SOCIAL NETWORKING SYSTEM THROUGH THE SECOND SERVER, THE ACTIVE FEEDS THAT ARE TO INCLUDE THE INFORMATION UPDATE
304

FIGURE 3

FOR EACH ACTIVE FEED FROM THE SET OF ACTIVE FEEDS, UPDATE THE VIEW OF
THE ACTIVE FEED TO INCLUDE THE INFORMATION UPDATE
208

UPDATE THE VIEW OF THE FEEDS TO INCLUDE THE INFORMATION
UPDATE INCLUDES TO CAUSE DISPLAY OF THE INFORMATION UPDATE AS
PART OF A GRAPHICAL USER INTERFACE INCLUDING THE ACTIVE FEED,
WHERE THE GRAPHICAL USER INTERFACE IS DISPLAYED ON A DISPLAY
DEVICE OF A CLIENT DEVICE USED BY AN ACTIVE USER THAT IS
CONNECTED TO THE SOCIAL NETWORKING SYSTEM, AND WHERE THE
CLIENT DEVICE IS COUPLED TO THE SECOND SERVER
402

UPDATE THE VIEW OF THE FEEDS TO INCLUDE THE INFORMATION
UPDATE IS PERFORMED WITHOUT RECEIVING A REQUEST FOR THE
INFORMATION UPDATE FROM A CLIENT DEVICE OF A USER OF THE
SOCIAL NETWORKING SYSTEM
404

DISTRIBUTED GENERATION OF LIVE FEED UPDATES IN A SOCIAL NETWORKING SYSTEM

TECHNICAL FIELD

One or more implementations relate to the field of online social network using a database system; and more specifically, to the distributed generation of live feed updates in a social networking system.

BACKGROUND

A social networking service is an online service, platform, or site that focuses on facilitating the building of social networks or social relations among people who may share interests, activities, real-life connections, or backgrounds. A social networking service consists of a representation or profile for each user, his/her social links, and a variety of additional services. Most social networking services are web-based and provide a way for users to interact over the internet, such as e-mail and instant messaging. Social networking sites allow users to share ideas, activities, events, and interests within their individual networks. Popular social networking services include Facebook™, Google+™, Twitter™, LinkedIn™, YouTube™, Foursquare™, Yelp™, Expedia™, MySpace™, and Flickr™. An individual may use many social networking sites, each which enable the individual to interact with other users via countless social network communications, or network feeds. Some social networking systems are enterprise social networking systems, which are increasingly becoming a common way to facilitate communication among people, any of whom can be recognized as users of the social networking system. One example of an enterprise social networking system is Chatter®, provided by salesforce.com, inc. of San Francisco, Calif.

In some social networking systems, users can access one or more social network feeds, which include information updates presented as items or entries in the feed. Such a feed item can include a single information update or a collection of individual information updates. A feed item can include various types of data including character-based data, audio data, image data and/or video data. A social network feed can be displayed in a graphical user interface (GUI) on a display device such as the display of a server. The information updates can include various social network data from various sources and can be stored in an on-demand database service environment.

The social networking systems generate personalized feeds which are delivered to various users. The social networking systems can generate a stream that includes an aggregation of several feeds. When an information update occurs in the social networking system, one or more feeds, such as group feeds, record feeds or user feeds can be eligible to receive the information update. In addition, when the information update occurs, one or more streams may be eligible to receive the information update as a result of including the feeds that are eligible to receive the information update. In a social networking system that includes several thousands to millions of users and/or records, and each user may subscribe to different records, follow multiple users, and/or include multiple feeds into a stream, it is challenging to determine the feeds and/or streams in which the information update should appear and to generate a live view of a feed or a stream including the information update to display to the users.

BRIEF DESCRIPTION OF THE DRAWINGS

The following figures use like reference numbers to refer to like elements. Although the following figures depict various exemplary implementations, alternative implementations are within the spirit and scope of the appended claims. In the drawings:

DETAILED DESCRIPTION

The following description describes methods and apparatus for enabling distributed generation of live feed updates in a social networking system. In some implementations, the user of a social networking system when connected to the system (i.e., logged-in to the system), may view a feed. When the user views the feed, they view a collection of feed items. When the user views a stream, they view a collection of feed items, where each feed item may belong to a feed. The stream includes feed items that may originate from several feeds. The implementations presented herein enable the user viewing a feed or a stream to receive an information update, in real time when the information update occurs in the social networking system without requiring the user to request the update. This process may be referred to as a live feed update such that an information update is pushed to all active users viewing a feed to which the information update belongs without the user requesting the update.

In one implementation, a social networking system is implemented on multiple servers. Each user from the users of the social networking system accesses the system through a client device coupled with one of the servers on which the social networking system is implemented. In response to an occurrence of an information update, the following operations are performed in the social networking service system. A first server from the multiple servers, transmits a representation of the information update to each one of other servers from the multiple servers. A second server from the other servers determines a set of active feeds associated with one or more active users that are connected to the social networking service through the second server. For each active feed from the set of active feeds, the social networking system updates a view of the active feed to include the information update.

Figure 1:
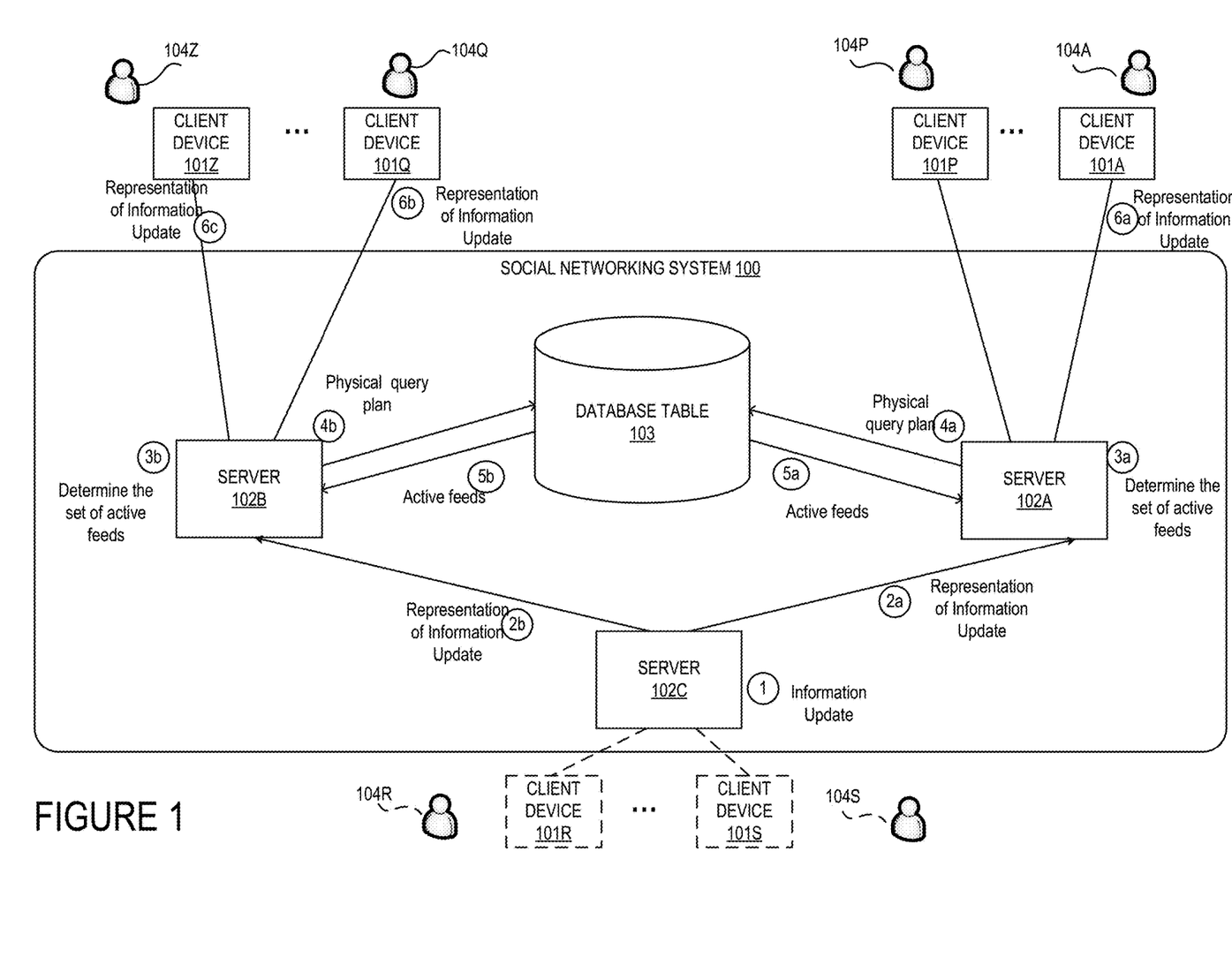
FIG. 1 illustrates a block diagram of an exemplary environment in which a distributed generation of live feed update is performed in a social networking system in accordance with one implementation.

FIG. 1 illustrates a block diagram of an exemplary environment in which a distributed generation of live feed update is performed in a social networking system in accordance with one implementation. The illustrated environment includes, the users 104A-Z (including users 104A, 104Q, and 104Z), client devices 101A-Z (including client devices: 101A, 101P, 101Q, 101Z, 101S, and 101R), the social networking system 100. The environment enables the users 104A-Z to access through the client devices 101A-Z the social networking system 100 that offers a social networking service. The social networking service enables the users of the client devices 101A-Z to communicate with one another, view and share updates regarding cases, accounts, groups or opportunities, etc. The various components of the illustrated environment may be part of a network (not illustrated) that couples the components to one another. For example, the network can be any one or any combination of a LAN (local area network), WAN (wide area network), telephone network, wireless network, point-to-point network, star network, token ring network, hub network, or other appropriate configuration. The network can include a TCP/IP (Transfer Control Protocol and Internet Protocol) network, such as the global internetwork of networks often referred to as the "Internet" with a capital "I." While the Internet is used as an example herein, it should be understood that the networks that the present implementations might use are not so limited.

The social networking system 100 implements an online social networking service, platform, or site that focuses on facilitating the building of social networks or social relations among people who may share interests, activities, real-life connections, or backgrounds. The social networking system 100 uses an on-demand database service to store, receive requests and answer the requests for data associated with the online social networking activity of users. The on-demand database service includes the database tables 103. The database tables 103 include a set of one or more rules that define the feeds and the streams. In particular, the database tables 103 include the rules that define the active feeds that are to include an information update that occurs in the social networking system 100. While the social networking system 100 is illustrated as including a single centralized database tables 103, in some implementations the social networking system 100 may include a greater number of database tables. For example, in one implementations, the social networking system 100 may include multiple distributed database tables that are accessible by each one of the servers 102A-C. While the database tables 103 are illustrated as being implemented on a separate hardware component than the respective servers to which it is connected, in other implementations, the database tables 103 may be part of one of the servers.

The social networking system 100 includes multiple servers 102A, 102B, and 102C. Each one of the servers 102A-C is an electronic device that is operative to be coupled with one or more client devices (e.g., server 102A is coupled with client devices 101A-P, server 102B is coupled with client devices 101Q-Z, and server 102C may be coupled with client devices 101S-R). Each one of the servers 102A-C is operative to receive an information update and update one or more active feeds with the information update as it will be described below in further details. While the illustrated social networking system includes three servers 102A-C, this is intended to be exemplary only. Other implementations can include any number of servers.

Each one of the servers 102A-C is coupled with a distinct set of client devices for push notifications. The servers 102A-C implements one or more services/operations offered to the users as part of the social networking service. In some implementations, each one of the servers 102A-C may receive requests and/or transmit responses and data to the client devices as a result of a load balancing mechanism. For example, a client device 101A may transmit a request for posting a new feed item to a feed to the social networking system 100. The request is received at server 102C which includes a load balancing mechanism that distributes the request to one of the servers 102A-C. In these implementation, requests of a client devices may be alternatively processed by the same or different servers.

Alternatively, each client device is coupled with a respective server for push notifications. In the scenarios of push notifications, the client device is coupled with a single server and all notifications that are to be pushed from the social networking system to the client device of a user are routed through the same server. The illustrated example of FIG. 1, shows client devices coupled with the server to which they are associated for push notifications. For example, client device 101A-P are coupled with server 102A, client devices 101Q-Z are coupled with server 102B, and client devices 101R-S are coupled with server 102C. This does not restrict each one of the client devices to access the social networking system 100 through this single server only. For example, the social networking system 100 may receive and process requests from a client device 101A through one or multiple servers (102A, 102B), however the client device 101A is coupled to the system through the same server 102A for push notifications. The social network system 110 may include one or more other software and/or hardware components for offering the social networking service to the users of the client devices 101A-Z. These additional components are not illustrated to allow for ease of understanding of the present implementations and this should not be considered a limitation of these implementations.

While each server is illustrated as being directly coupled with another server or a client device, for example server 102A is directly coupled with client device 101A and it is directly coupled with server 102C, these connections are a logical representation of underlying physical connections. In some implementations, the server may be coupled to another server or to a client device through one or more other physical devices (e.g., switches, routers, servers, etc.) that are not illustrated.

The client devices 101A-Z allow users of the social networking service to access the service and view one or more feeds and streams. The client devices 101A-Z are electronic devices (e.g., laptop, workstation, smartphone, palm top, mobile phone, tablets, gaming system, set-top box, etc.) that are capable of accessing network resources (e.g., they include software such as client network applications (e.g., web browsers, mobile applications, etc.) that are capable of accessing network resources) and connect to the social networking system 100 for requesting a feed. The client devices 101A-Z may be coupled to the social networking system 100 through a network (not illustrated).

For example, each client device 101A-Z could include a desktop personal computer, workstation, laptop, PDA, cell phone, or any wireless access protocol (WAP) enabled device or any other server capable of interfacing directly or indirectly to the Internet or other network connection. In one exemplary implementation, a client device may run an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the social networking service) of the client device to access, process and view information, pages and applications available to it from social networking system 100 over a network. While each client device is illustrated as being directly coupled with a server, for example client device 101A directly coupled with server 102A, this connection is a logical representation of an underlying physical connection. In some implementations, the client device may be coupled to the server through one or more other physical devices (e.g., switches, routers, servers, etc.) that are not illustrated.

The social networking system 100 generates personalized feeds which are delivered to various users. A feed, which can also be referred to as a social networking feed, includes a set of one or more items or entries. Such a feed item can include a single item or a collection of an item and sub-item related to the item. A social network feed can be displayed in a graphical user interface (GUI) on a display device such as the display of the client devices 101A-Z. The feed items can include social network data from various sources and can be stored in the database tables 103.

As examples, a feed item can be a message, such as a user-generated post of data, and a feed tracked update to a record or profile, such as a change to a field of the record. The feed items can be organized in chronological order when displayed in a graphical user interface (GUI), for instance, on the user's profile page, as part of the user's profile feed. A feed can be a combination of messages and feed tracked updates Messages include text created by a user, and may include other data as well. Examples of messages include posts, user status updates, and comments. Messages can be created for a user's profile or for a record. Messages can be created by various users, potentially any user, although some restrictions can be applied. Posts can include alpha-numeric or other character-based user inputs such as words, phrases, statements, questions, emotional expressions, and/or symbols. Comments generally refer to responses to posts or to other information updates, such as words, phrases, statements, answers, questions, and reactionary emotional expressions and/or symbols. Multimedia data can be included in, linked with, or attached to a post or comment. For example, a post can include textual statements in combination with a JPEG image or animated image. A like or dislike can be submitted in response to a particular post or comment. Examples of uploaded files include presentations, documents, multimedia files, and the like. In contrast to a post, a user status update changes a status of a user and can be made by that user or an administrator. As an example, posts can be made to a wall section of a user's profile page (which can include a number of recent posts) or a section of a record that includes multiple posts. A record can also have a status, the update of which can be provided by an owner of the record or other users having suitable write access permissions to the record. The owner can be a single user, multiple users, or a group. In one implementation, there is only one status for a record.

In some implementations, a comment can be made on any feed item. In some implementations, comments are organized as a list explicitly tied to a particular feed tracked update, post, or status update. In some implementations, comments may not be listed in the first layer (in a hierarchal sense) of feed items, but listed as a second layer branching from a particular first layer feed item.

Feed items of information about a user can be presented in a user's profile feed, feed items of information about a group can be presented in a group feed, and feed items of information about a record can be presented in a record feed in the database, by way of example.

A "group" is generally a collection of users. In some implementations, the group may be defined as users with a same or similar attribute, or by membership. In some implementations, a "group feed", also referred to herein as a "group news feed", includes one or more feed items about any user in the group. In some implementations, the group feed also includes information updates and other feed items that are about the group as a whole, the group's purpose, the group's description, and group records and other objects stored in association with the group. Threads of information updates including group record updates and messages, such as posts, comments, likes, etc., can define group conversations and change over time.

An "entity feed" or "record feed" generally refers to a feed of feed items about a particular record in the database, such as feed tracked updates about changes to the record and posts made by users about the record. An entity feed can be composed of any type of feed item. Such a feed can be displayed on a page such as a web page associated with the record, e.g., a home page of the record.

As used herein, a "profile feed" or "user's profile feed" is a feed of feed items about a particular user. In one example, the feed items for a profile feed include posts and comments that other users make about or send to the particular user, and status updates made by the particular user. Such a profile feed can be displayed on a page associated with the particular user. In another example, feed items in a profile feed could include posts made by the particular user and feed tracked updates initiated based on actions of the particular user.

A stream is a type of feed that includes an aggregation of two or more feeds. The feed items of a stream originates from at least two feeds such as a user profile feed, a record feed (e.g., an account, opportunities, cases, etc.), or a group feed. The stream provide to the user a combined view of the feeds selected to be part of the stream. In some implementations, a feed can be added to the stream without requiring that a user follows the feed.

In some implementations, a streams is a custom feed that a user may create by selecting two or more feeds to be included in the stream. In other implementations, a stream can be automatically generated by the social networking system. For example, the social networking system 100 may generate a stream including all the feeds to which a user follows. Updates associated with a feed that is included in a stream are one type of information update that can occur and be added to the stream to be viewed by the user. An active feed or an active stream is a feed or a stream that a user is currently viewing.

While the implementations herein are described with respect to feeds and active feeds, the implementations are not so limited. In particular, the current implementations are also applicable to streams and active streams, where a stream is an aggregation of two or more feeds. The stream can be also be regarded as a feed of several feeds.

The social networking system 106 may allow a user to follow data objects in the form of records such as cases, accounts, or opportunities, in addition to following individual users, groups of users, and streams of users. The "following" of a record, a stream, a user or a group of users stored in a database, allows a user to track the progress of that record, stream, user or group of users. Updates associated with the followed entity (i.e., a record, user, or group of users) are one type of information update that can occur and be noted on a social network feed such as an entity feed, a news feed of a user subscribed to the entity, or a stream. An information update is an event that occurs in relation to a feed or a stream. Examples of information updates can be a new feed item, a comment to a feed item, a like, an upvote, an edit of an existing feed item, a deletion of an existing feed item, etc. An information update can be an event that occurs in the social networking system that changes the state of a feed and/or a stream by performing an action on a feed item or a sub_item (such as a comment to a feed item).

When an information update occurs in the social networking system 100, one or more feeds, such as record feeds, group feeds or user's profile feeds can be eligible to receive the information update. In a social networking system that includes several thousands to millions of users and/or records, and each user may subscribe to different records or follow multiple users, it is challenging to determine the feeds in which the information update should appear as a feed item and be viewed by the user in substantially real time. It is challenging to determine the active streams that are to receive the information update.

The operations 1-6c of FIG. 1 illustrates exemplary operations performed at the social networking system 100 for enabling a distributed live update of a feed. At operation 1, an information update occurs in the social networking system 100 (e.g., a new post is posted on a user's profile feed, or a comment to a post, etc.). The information update is received or detected at the server 102C. The server transmits a representation of the information update to all the other servers of the social networking system 100. For example, at operation 2a, the representation of the information update is transmitted to the server 102A. At operation 2b, the representation of the information update is transmitted to the server 102B. In some implementations, the representation is an indication of how to obtain the information update. For example, in a non-limiting implementations, the representation of the information update is a cache key, rather than the actual information update itself. In these implementations, the first server 102C caches the information update, transmits the cache key associated with the information update to other servers (e.g., 102A and 102B). The servers 102A and 102B may retrieve the information update from the cache upon receipt of the cache key. In other implementations, the representation is a copy of the information update In a non-limiting example, the server 102C may transmit a copy of the information to each server instead of a cache key.

The server 102A determines, at operation 3a, the set of feeds that are to include the information update and that active users connected to the social networking system 100 through the server 102A are viewing. The active users of the social networking system 100 may be viewing different feeds and streams. Not all of these feeds/streams are to include the information update. The database tables 103 include rules that define the feeds that are to include the information update. Determining the set of active feeds that are to include the information update includes transmitting a physical query plan, at operation 4a, to the database tables 103 and receiving from the database tables 103 these active feeds at operation 5a. Simultaneously, the server 102B determines, at operation 3b, the set of active feeds that are to include the information update and that active users connected to the social networking system 100 through the server 102B are viewing. Determining the set of active feeds includes transmitting a physical query plan, at operation 4b, to the database tables 103 and receiving from the database tables 103 the active feeds at operation 5b. In some implementations, the active feeds are determined based on the active users that are associated with the server for push notifications. The servers, here server 102A and server 102B perform the determination in parallel, independently of one another.

Upon determination of the active feeds that are to receive the information update, the server updates the feeds to include the information update. For example, the representation of the information update is transmitted to the client device 101A, at operation 6a, to be displayed as a feed item of the active feed and be viewed by the user 104A. Similarly, the representation of the information update is transmitted to the client device 101B, at operation 6b, to be displayed as a feed item of the active feed and be viewed by the user 104B.

In contrast to existing approaches where the update of active feeds is performed by determining the active feeds in a central server over all active users connected to the social networking system 100, the implementations described herein provide a more efficient and more performant mechanism for updating the active feeds by distributing the operation over multiple servers. Each server determines the active users among the users that are coupled to this particular server as opposed to considering all of the users of the social networking system 100. Thus, the implementations described herein reduce the latency of displaying a new information update that is part of a feed included in a feed that a user is viewing by in part distributing the operation of determining the feeds to which the information update belongs on several servers. Further, each server performs the determination for a subset of users of the social networking service instead of performing the determination for all the users of the social networking service. For example, the subset of users can be the users that are coupled with the server for receiving push notifications. The servers, here server 102A and server 102B perform the determination in parallel, independently of one another.

Figure 2:
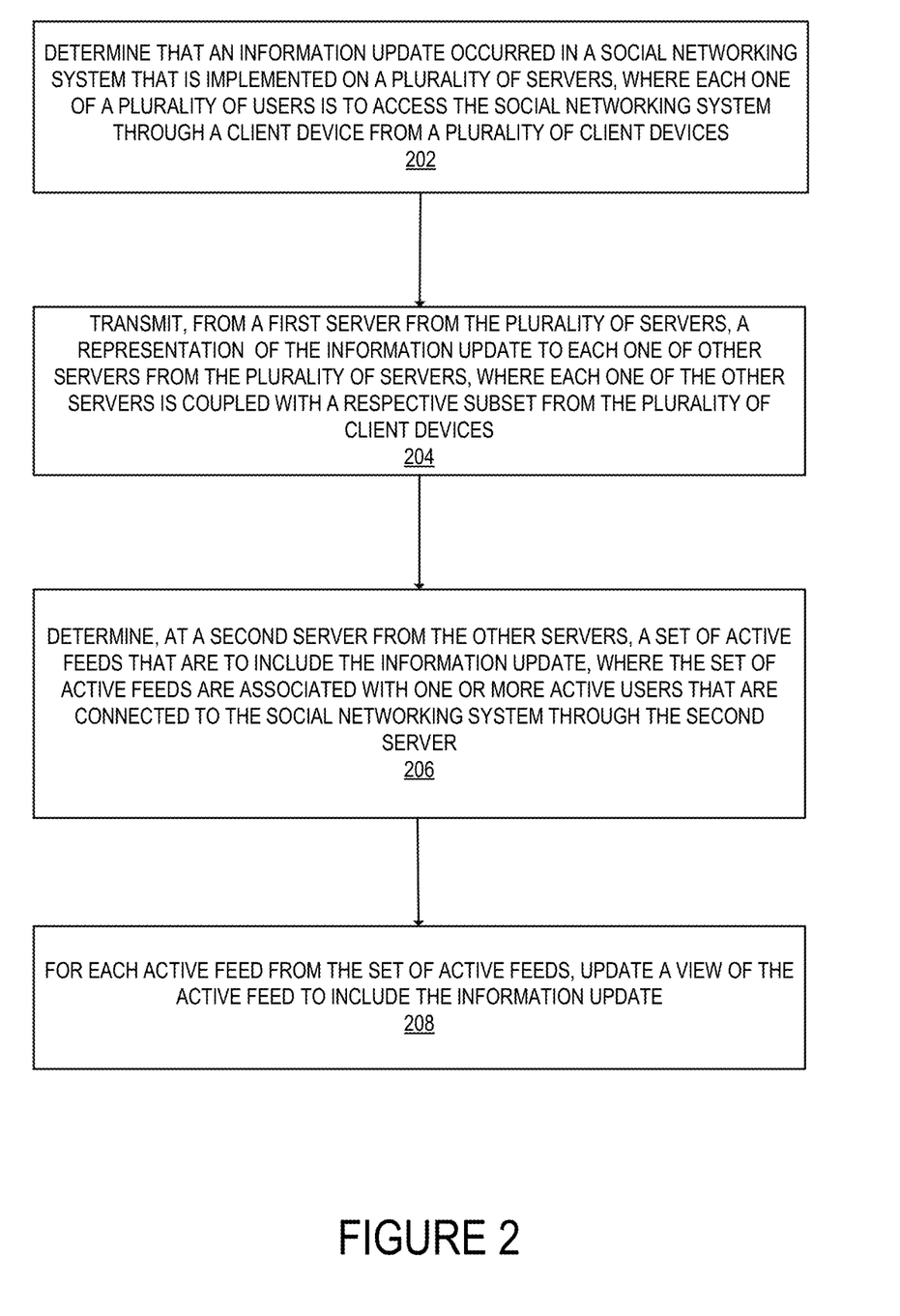
FIG. 2 illustrates a block diagram of exemplary operations performed in a social networking system for enabling a distributed generation of live feed updates in a social networking system in accordance with some implementations.
Figure 3:
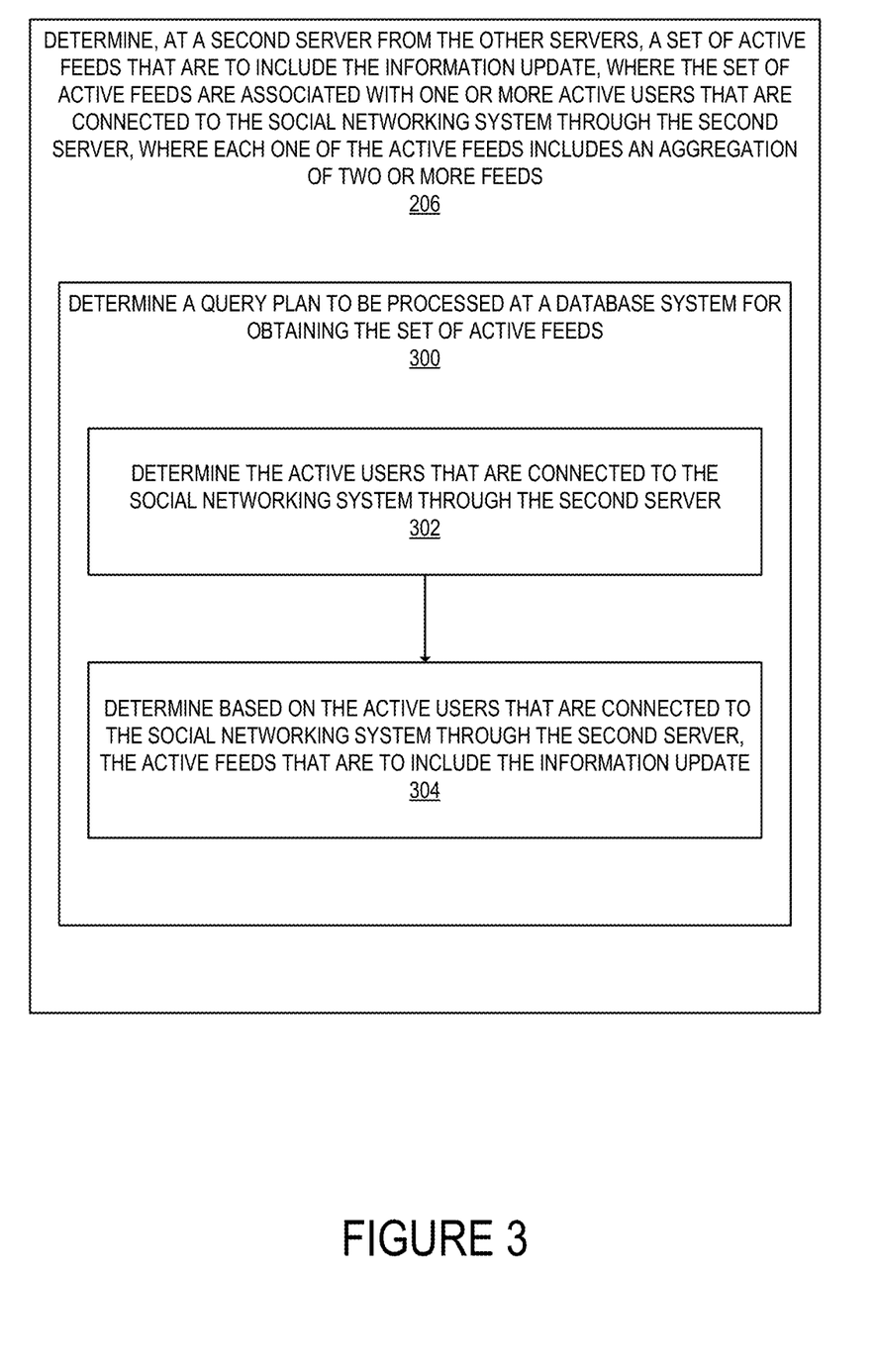
FIG. 3 illustrates a flow diagram of exemplary operations for determining a set of active feeds that are to receive the information update in accordance with some implementations
Figure 4:
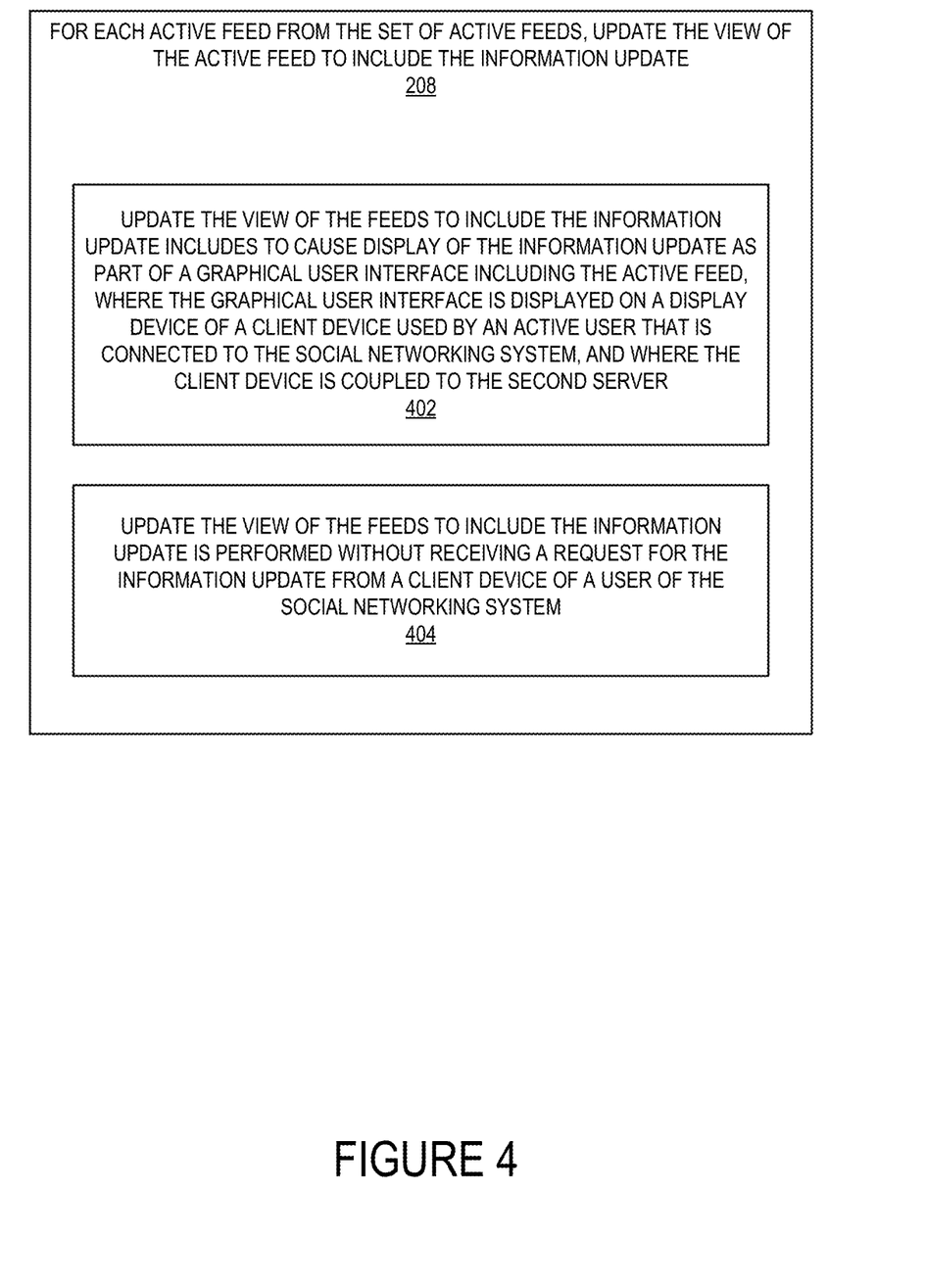
FIG. 4 illustrates a flow diagram of exemplary operations performed for updating the view of an active feed to include the information update in accordance with some implementations.

The operations in the flow diagrams of FIGS. 2-4 are be described with reference to the exemplary implementations of FIG. 1. However, the operations of the flow diagrams can be performed by implementations other than those discussed with reference to FIG. 1, and the implementations discussed with reference to FIG. 1 can perform operations different than those discussed with reference to the flow diagrams of FIGS. 2-4.

FIG. 2 illustrates a block diagram of exemplary operations performed in a social networking system for enabling a distributed generation of live feed updates in a social networking system in accordance with some implementations. At operation 202, the social networking system 100 determines that an information update occurred. The social networking system 100 that is implemented on a plurality of servers (e.g., servers 102A-C). Each one of the users of the social networking system is to access the social networking system 100 through a client device (e.g., 101A) from a plurality of client devices (e.g., 101A-C). As described above with reference to FIG. 1, updates associated with a feed that is included in a feed are one type of information update that can occur in the social networking system 100. Examples of information updates are a new post to a feed, a new comment on a feed item, a "like" "dislike" of a feed item, etc.

Upon determining that the information update occurred, the flow of operations moves to operation 204, at which a first server transmits a representation of the information update to each one of other servers from the plurality of servers. Each one of the other servers is coupled with a respective subset from the plurality of client devices. For example, the server 102C transmits a representation of the information update to each one of the servers 102A-B. The server 102A is coupled with client devices 101A-P and the server 102B is coupled with client devices 101Q-Z. The representation of the information update is transmitted to the servers regardless of its type or identification (e.g., the feeds to which it belongs, the users that generated the information update). In some implementations, the information update originates from the one of the client devices 101A-Z, in other implementations, the information update may originate from other client devices and/or other users than 101A-101Z. In some implementations, the representation is an indication of how to obtain the information update. For example, in a non-limiting implementations, the representation of the information update is a cache key, rather than the actual information update itself. In these implementations, the first server 102C caches the information update, transmits the cache key associated with the information update to other servers (e.g., 102A and 102B). The servers 102A and 102B may retrieve the information update from the cache upon receipt of the cache key. In other implementations, the representation is a copy of the information update In a non-limiting example, the server 102C may transmit a copy of the information to each server instead of a cache key.

The flow of operations moves from operation 204 to operation 206, at which a second server from the other servers determines a set of active feeds associated with one or more active users that are connected to the social networking system through the second server. The active feeds are determined as active feeds that need to receive the information update. For example, when the feed is a stream, it includes at least one feed to which the information update is to be displayed as a feed item. The information update can be a comment on an existing post of the feed, a new post, or any other type of information update. The second server can be any of the servers that received the information updates, for example, server 102A or server 102B. In some implementations, the first server 102C that received/detected the information update may also be coupled with a set of client devices (e.g., 101A-R) that are used by users 104S-R and may also determine if a set of active feeds associated with these users need to be updated to include the information update.

FIG. 3 illustrates a flow diagram of exemplary operations for determining a set of active feeds that are to receive the information update in accordance with some implementations. In some implementations determining the set of active feeds that are to include the information update includes operations 300, 302 and 304. At operation 300, the second server (e.g., server 102A or server 102B) determines a query plan that is to be processed at a database system for obtaining the set of active feeds. In some implementations, determining the query plan includes operations 302 and 304. At operation 302, the active users that are connected to the social networking system through the second server are determined. An active user is a user that is logged-in to the social networking service and is, at the moment that the information occurs in the system, viewing a feed or a stream and browsing through the graphical interface of the social networking service. In some implementations, determining the active users that are connected to the social networking system through the second server includes transmitting a first query to the database tables 103 to retrieve all active users connected to the server. In other implementations, determining the active users that are connected to the social networking system through the second server includes transmitting the first query to a database table (not illustrated) from a set of distributed database tables to retrieve all active users connected to the respective server.

Not all of the active users are to receive the information update since not all of these users are viewing feeds that would include the information update. Thus, the flow of operations moves from operation 302 to operation 304, at which the second server (e.g., 102A or 102B) determines based on the active users that are connected to the social networking system through the second server, the active feeds that are to include the information update. In some implementations, determining the active feeds that are to include the information update includes transmitting a second query to the database tables (e.g., 103) to retrieve for the active users determined the associated feeds that are to include the information update. This may include determining the one or more feeds that are to include the information update and determining the feeds that are active, i.e., that an active user is viewing.

Referring back to FIG. 2, once the active feeds are determined, the flow of operations moves from operation 206 to operation 208, at which for each active feed from the determined set of active feeds, the social networking system 100 updates a view of the active feed to include the information update.

Figure 5A:
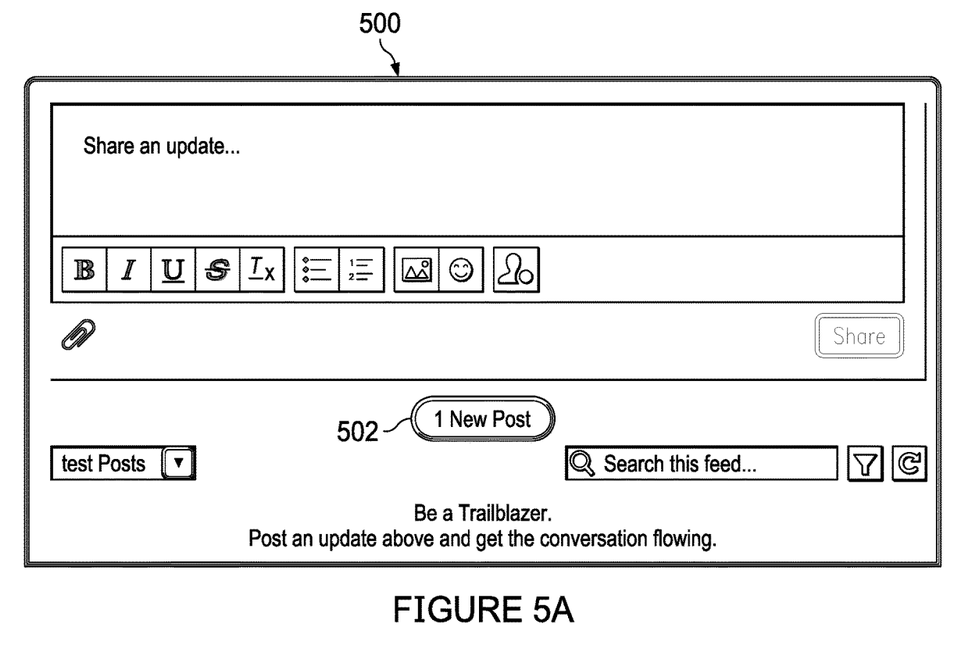
FIG. 5A illustrates an exemplary graphical user interface (GUI) for displaying an information update included in a feed in accordance with one implementation.
Figure 5B:
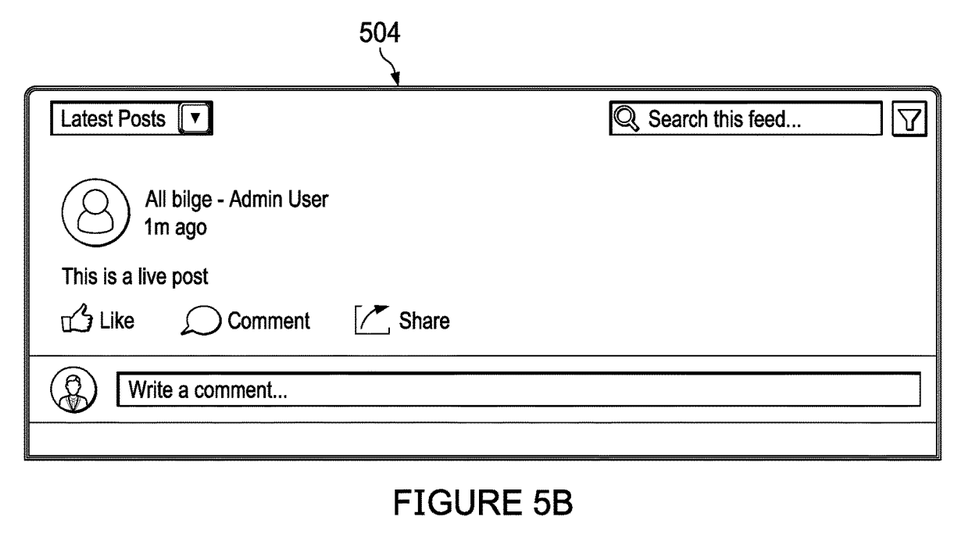
FIG. 5B illustrates an exemplary GUI for displaying an information update included in a feed in accordance with one implementation.

FIG. 4 illustrates a flow diagram of exemplary operations performed for updating the view of an active feed to include the information update in accordance with some implementations. At operation 402 updating a view of the active feed to include the information update includes causing display of the information update as part of a graphical user interface including the active feed. The graphical user interface is displayed on a display device of a client device used by an active user that is connected to the social networking system through the second server. FIG. 5A-B illustrate exemplary graphical user interface (GUI) for displaying an information update included in a feed in accordance with one implementation. The graphical user interface 500 can be displayed on a display device of the client device 101A or 101B, when a user has selected to view a feed from a set of one or more feeds that they had generated. In the illustrated GUI, a notification element 502 is displayed to the feed to inform the user that a new information update has occurred in the feed. The information update can any of a new feed item (e.g., a new post, a new message, etc.) or an event related to an existing feed item, such as a comment on a feed item, a like, upvote, a deletion or any other event. This notification element 502 is displayed to the user as a result of operations performed in the social networking system as described with referrence to FIGS. 1-4. Referring back to FIG. 4, at operation 404, the view of the active feed to include the information update, e.g., as displayed in GUI 500, is performed without receiving a request for the information update from the client device of the user that is viewing the feed. The view is updated automatically by the social networking system 100 upon determination that the new information update had occurred and that the feed is to include this information update. Thus the notification element is displayed as a result of these operations.

The user may select the notification element 502 and view the details of the information update. FIG. 5B illustrates the information update 504 as viewing by the user once it has selected the notification element 502.

In contrast to existing approaches where the update of active feeds is performed by determining the active feeds in a central server over all active users connected to the social networking system 100, the implementations described herein provide a more efficient and more performant mechanism for updating the active feeds by distributing the operation over multiple servers. Each server determines the active users among the users that are coupled to this particular server as opposed to considering all of the users of the social networking system 100. Thus, the implementations described herein reduce the latency of displaying a new information update that is part of a feed included in a feed that a user is viewing by in part distributing the operation of determining the feeds to which the information update belongs on several servers. Further, each server performs the determination for a subset of users of the social networking service instead of performing the determination for all the users of the social networking service. For example, the subset of users can be the users that are coupled with the server for receiving push notifications. The servers, here server 102A and server 102B perform the determination in parallel, independently of each other.

Figure 6:
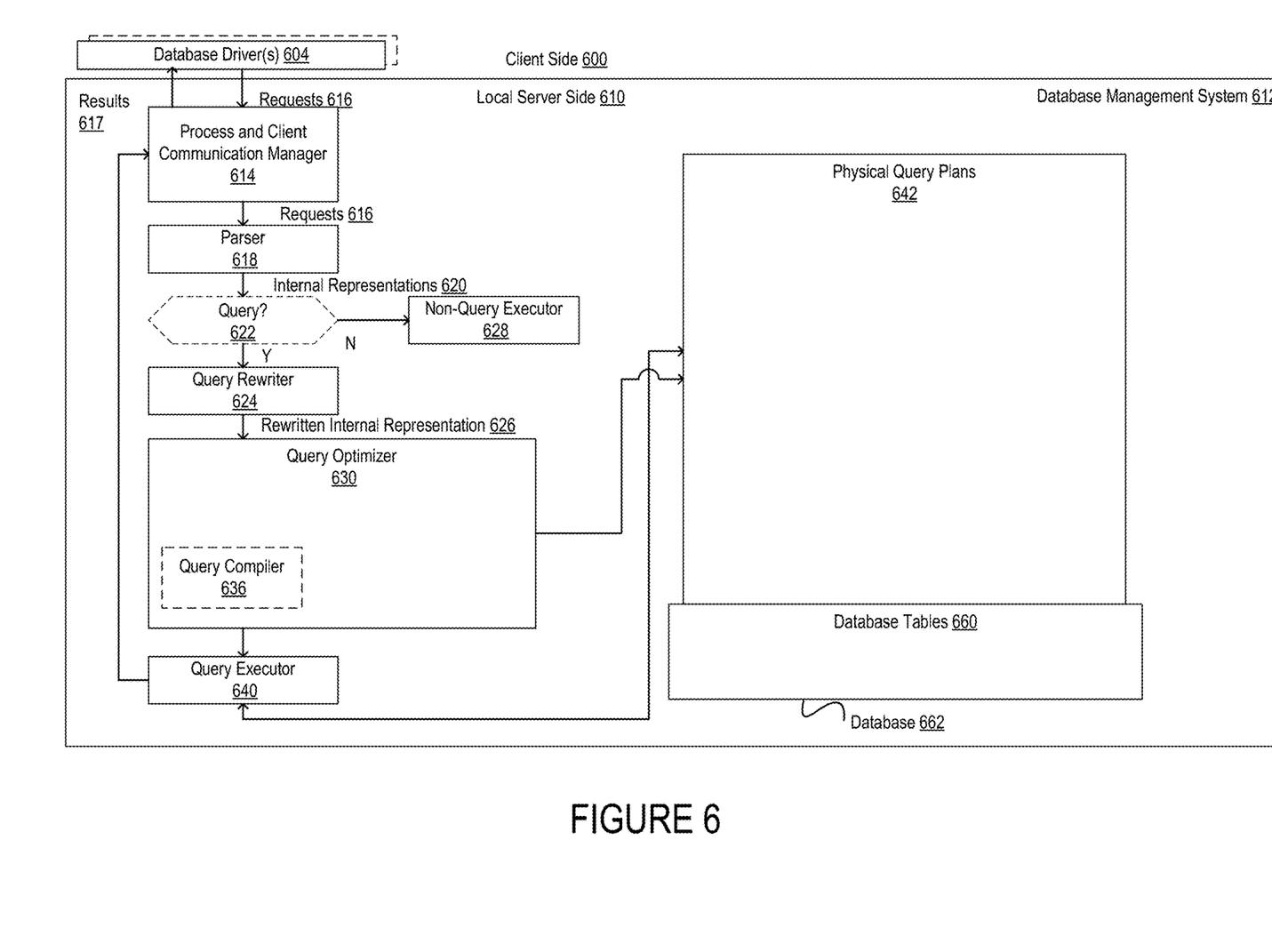
FIG. 6 is a block diagram illustrating a data base management system according to one implementation.

Architecture:

FIG. 6 is a block diagram illustrating a data base management system according to one implementation. FIG. 6 divides into a client side 600 and a server side 610. The client side 600 includes one or more clients (not shown), each including one of the database driver(s) 604 (also known as a remote procedure call (RPC) module) as well as other components known in the art (not shown). In some implementations, each of the servers 102A-C include part of the functionalities described herein with respect to the local server side 610 of FIG. 6. For example, each one of the servers 102A-C includes a combination of the operations 614, 618, 622, 624, 630, and 640. In some implementations the database tables 103 is implemented as described with reference to database 662. In other implementations some of the operations 614-640 may be included as part of the database tables and other operations are included as part of the servers 102A-C.

The server side 610 includes the database management system (DBMS) 612. The DBMS 612 includes a database in which clients store, and from which clients retrieve, data. The DBMS 612 includes components named according to the components commonly found in DBMSs (e.g., Joseph M. Hellerstein, Michael Stonebraker, and James Hamilton, "Architecture of a Database," Foundations and Trends in Databases, Vol. 1, No. 2 (2007), pages 141-259; Joseph M. Hellerstein and Michael Stonebraker, "Anatomy of a Database," Readings in Database Systems, Fourth Edition, The MIT Press (2005), pages 42-95), such as a process and client communication manager (PCCM) 614, a parser 618, a query rewriter 624, a query optimizer 630 and a query executor 640 (also known as an executor or query plan executor). The term "query processor" refers to the combination of the parser 618, the query rewriter 624, the query optimizer 630 and the query executor 640.

The process and client communication manager 614 (which, in some implementations is made as separate managers; and is also sometimes referred to as just the process manager) may perform a variety of tasks, including: 1) establishing and storing the connection state for the client(s), responding to client requests in the form of requests 616, and returning results 617; and/or 2) encapsulating and scheduling the various tasks of the DBMS 612 (including performing admission control). Connections are established between the database driver(s) 604 of the client(s) and the process and client communication manager 614. The database driver(s) 604 submit the requests 616 to the PCCM 614.

The PCCM 614 provides the requests 616 to the parser 618. In one implementation, the tasks of the parser 618 include converting the requests 616 into internal representations 620 (e.g., abstract syntax trees (ASTs)). A decision block 622 illustrates distinguishing those of the requests 216 that are SQL queries from those that are not. Decision block 622 is dashed because this decision can be made at one or more different locations in the DBMS 612 (e.g., at its illustrated location, and/or between the query optimizer 630 and the query executor 640, and/or as part of the query executor 640). At the illustrated location, those of the internal representations 620 that were generated from the requests 616 that are SQL queries go to the query rewriter 624, while those that are not go to a non-query executor 628.

The query rewriter 624 simplifies and normalizes the internal representations 620 of the SQL queries to produce rewritten internal representations 626 (e.g., rewritten ASTs representing the structure and contents of the query strings) that are provided to the query optimizer 630. While the query rewriter 624 is illustrated as a separate component, in some implementations it is part of the parser 618 or the query optimizer 630 as in some commercial DBMSs.

The query optimizer 630 generates query plans (which may include performing query plan optimization) from the rewritten internal representations 626. In some implementations, for each of the rewritten internal representations 626, the query optimizer 630 first creates a "logical query plan" (further described later herein) prior to creating a "physical query plan" (also known as "fully specified query plan") in physical query plans 642. Different implementations may generate logical query plan in different ways, including those that are well known in the art (e.g., Van den Bussche, J., Vansummeren, S., Translating SQL into the Relational Algebra, available at https://cs.ulb.ac.be/public/_media/teaching/infoh417/sql2alg_eng.pdf, retrieved October 2016; Kifer, M. et al, Database Systems: Application Oriented Approach, Complete Version—2nd edition, ISBN-13: 978-0321268457, Mar. 26, 2005). For example, in one implementation a logical query plan is created from a rewritten internal representation by walking the AST and creating nodes from the AST which correspond to query plan operators (e.g., PROJECT for a "select" statement, JOIN or SELECT for a "where" clause, etc.).

The query executor 640 executes the physical query plans 642 corresponding to the SQL queries, which includes accessing the specified data from the specified database tables in the database 662, performing the query plan operations specified by those physical query plans, and providing the results to the process and client communication manager 614; which in turn provides those results (shown as results 617) to the respective ones of the clients that submitted the respective SQL queries.

Each of the physical query plans 642 comprises a directed graph of nodes connected by edges, wherein each of the directed graphs represents an ordered set of query plan operators that when executed provides the query result for an SQL query.

In one implementation, the query optimizer 630 includes a query compiler 636 that compiles the query plan into machine code or an interpretable query plan (to enable cross platform portability and which may be lightweight (e.g., an annotated relational algebra expression) or in a lower level language (e.g., Java byte codes)).

Each of the nodes of the directed graphs in the physical query plans 642 represents one of the query plan operators of the physical query plans 642. The nodes of the physical query plans 642 may be referred to as "nodes" or "physical query plan nodes" (PQPNs).

The non-query executor 628 may execute an INSERT operation (i.e., insert one or more data records in a table of the database), UPDATE operation (i.e., change the contents of one or more data records in tables of the database), DELETE operation (i.e., delete one or more data records in one or more tables of the database), and optionally other operations that modify the contents of a table; as well as executes at least CREATE TABLE, and optionally other Data Definition Language (DDL) operations that don't change the content of tables, but the tables themselves (e.g., the schema).

In one implementation, operation of the DBMS 612 begins with no query plans (logical or physical). Responsive to one or more CREATE TABLE statements in requests 616, the DBMS 612 creates a table. Responsive to a first SQL query being received, the DBMS 612 generates and executes a first physical query plan, and returns a query result to the client that submitted the first SQL query.

The arrowed lines between the PCCM 614, parser 618, query rewriter 624, query optimizer 630, query executor 640, and non-query executor 628 in FIG. 6 represent some type of coupling, such as data flow and/or connectivity. For instance, in some implementations the PCCM 614 calls each of the parser 618, query rewriter 624, query optimizer 630, query executor 640, and non-query executor 628 to coordinate the executing of the SQL statements 616, and thus the arrowed lines represent an order as opposed to, for example, the parser 618 calling the query rewriter 624.

One or more parts of the above implementations may include software and/or a combination of software and hardware. An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), Flash memory, phase change memory, solid state drives (SSDs)) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists the code/data even when the electronic device is turned off (when power is removed), and the electronic device copies that part of the code that is to be executed by the processor(s) of that electronic device from the non-volatile memory into the volatile memory of that electronic device during operation because volatile memory typically has faster read/write times. As another example, an electronic device may include a non-volatile memory (e.g., phase change memory) to store the code/data when the electronic device is turned off, and that same non-volatile memory has sufficiently fast read/write times such that, rather than copying the part of the code to be executed into volatile memory, the code/data may be provided directly to the processor(s) (e.g., loaded into a cache of the processor(s)); in other words, this non-volatile memory operates as both long term storage and main memory, and thus the electronic device may have no or only a small amount of DRAM for main memory. Typical electronic devices also include a set of one or more physical network interface(s) to establish network connections (to transmit and/or receive code and/or data using propagating signals) with other electronic devices.

Figure 7:
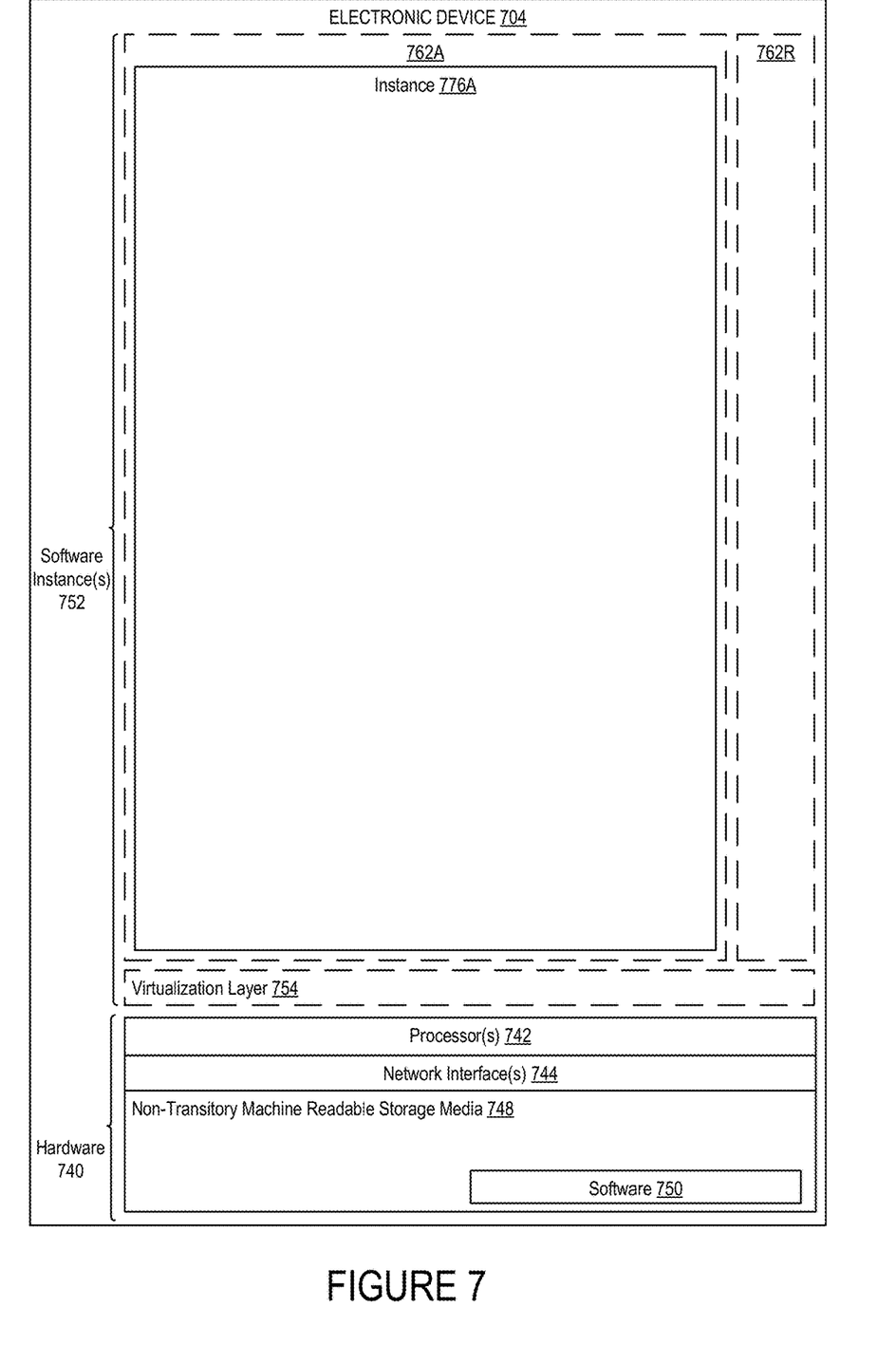
FIG. 7 illustrates an electronic device, according to one implementation.

FIG. 7 illustrates an electronic device 704 according to one implementation. FIG. 7 includes hardware 740 comprising a set of one or more processor(s) 742, a set or one or more network interfaces 744 (wireless and/or wired), and non-transitory machine-readable storage media 748 having stored therein software 750. Each of the previously described end client devices 101A-Z, servers 102A-C, and database tables 103 may be implemented in one or more electronic device 704. In one implementation, each of the client devices is implemented in a separate one of the electronic devices 704 (e.g., in an end user electronic device operated by an end user; in which case, the software 750 in each such end user electronic device includes the software to implement one of the end user clients, including software to interface with the social networking system 100 (e.g., an API, a web browser, a native client, a portal, a command-line interface, etc.)) and the social networking system 100 is implemented in a separate set of the electronic devices 704 (in which case, the software 750 is the software to perform the operations described with reference to FIGS. 1-5); in operation, the end user electronic devices and the electronic device(s) implementing the social networking service would be commutatively coupled (e.g., by a network) and would establish between them (or through one or more other layers) connections for pushing information updates to be included in feed viewed by the end user consequently enabling live feed updates.

In electronic devices that use compute virtualization, the processor(s) 742 typically execute software to instantiate a virtualization layer 754 and software container(s) 762A-R (e.g., with operating system-level virtualization, the virtualization layer 754 represents the kernel of an operating system (or a shim executing on a base operating system) that allows for the creation of multiple software containers 762A-R (representing separate user space instances and also called virtualization engines, virtual private servers, or jails) that may each be used to execute a set of one or more applications; with full virtualization, the virtualization layer 754 represents a hypervisor (sometimes referred to as a virtual machine monitor (VMM)) or a hypervisor executing on top of a host operating system, and the software containers 762A-R each represent a tightly isolated form of software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 750 (illustrated as instance 776A) is executed within the software container 762A on the virtualization layer 754. In electronic devices where compute virtualization is not used, the instance 776A on top of a host operating system is executed on the "bare metal" electronic device 704. The instantiation of the instance 776A, as well as the virtualization layer 754 and software containers 762A-R if implemented, are collectively referred to as software instance(s) 752.

Alternative implementations of an electronic device may have numerous variations from that described above. For example, customized hardware and/or accelerators might also be used in an electronic device.

In the above description, numerous specific details such as resource partitioning/sharing/duplication implementations, types and interrelationships of system components, and logic partitioning/integration choices are set forth in order to provide a more thorough understanding. It will be appreciated, however, by one skilled in the art, that the invention may be practiced without such specific details. In other instances, control structures, logic implementations, opcodes, means to specify operands, and full software instruction sequences have not been shown in detail since those of ordinary skill in the art, with the included descriptions, will be able to implement what is described without undue implementation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

In the following description and claims, the term "coupled," along with its derivatives, may be used. "Coupled" is used to indicate that two or more elements, which may or may not be in direct physical or electrical contact with each other, co-operate or interact with each other.

While the flow diagrams in the figures show a particular order of operations performed by certain implementations, it should be understood that such order is exemplary (e.g., alternative implementations may perform the operations in a different order, combine certain operations, overlap certain operations, etc.).

While the above description includes several exemplary implementations, those skilled in the art will recognize that the invention is not limited to the implementations described and can be practiced with modification and alteration within the spirit and scope of the appended claims. The description is thus illustrative instead of limiting.

What is claimed is:

1. A method comprising:
   in response to an occurrence of an information update that relates to a feed in a social networking system that is implemented on a plurality of servers, wherein each one of a plurality of users accesses the social networking system through a client device from a plurality of client devices, performing the following:
   transmitting, from a first server from the plurality of servers, a representation of the information update to other servers from the plurality of servers, wherein each one of the other servers is coupled with a respective distinct subset of client devices from the plurality of client devices;
   determining, at a second server from the other servers, for the information update a subset of active feeds from a plurality of active feeds, the subset of active feeds being less than the plurality of feeds, wherein the determining includes determining the users of client devices that are coupled to the second server for push notifications, wherein at the moment of occurrence of the information update the users are logged-in to the social networking system and viewing a feed or a stream through a graphical user interface of the social networking system; and
   for an active feed from the subset of active feeds, updating a view of the active feed to include the information update.

2. The method of claim 1, wherein determining, at the second server from the other servers, the subset of active feeds includes:
   determining a query plan;
   transmitting the query plan including the rules that define the feeds for the information update; and
   receiving the subset set of active feeds.

3. The method of claim 1, wherein updating a view of the active feed to include the information update includes causing display of the information update as part of a graphical user interface including the active feed, wherein the graphical user interface is displayed on a display device of a client device used by an active user that is connected to the social networking system, and wherein the client device is coupled to the second server.

4. The method of claim 1, wherein updating a view of the active feed to include the information update is performed without receiving a request for the information update from a client device of a user of the social networking system.

5. The method of claim 1, wherein the representation of the information update is a cache key that is used to retrieve the information update from a cache.

6. A system comprising:
   a first server from a plurality of servers implementing a social networking system, wherein each one of a plurality of users accesses the social networking system through a client device from a plurality of client devices, the first server including a first processor and a first non-transitory computer readable storage medium storing instructions which when executed by the first processor cause the first server to:
   in response to an occurrence of an information update relates to a feed in the social networking system, transmit a representation of the information update to other servers from the plurality of servers, wherein each one of the other servers is coupled with a respective distinct subset of client devices from the plurality of client devices; and
   a second server from the other servers, the second server including a second processor and a second non-transitory computer readable storage medium storing instructions which when executed by the second processor cause the second server to:
   determine for the information update a subset of active feeds from a plurality of active feeds, the subset of the active feeds being less than the plurality of active feeds, wherein to determine includes to determine the users of client devices that are coupled to the second server for push notifications, wherein at the moment of occurrence of the information update the users are logged-in to the social networking system and viewing a feed or a stream through a graphical user interface of the social networking system; and for an active feed from the subset of active feeds, update a view of the active feed to include the information update.

7. The system of claim 6, wherein to determine the subset of active feeds includes to:

determine a query plan;

transmit the query plan including the rules that define the feeds for the information update; and receive the subset of active feeds.

8. The system of claim 6, wherein to update a view of the active feed to include the information update includes to cause display of the information update as part of a graphical user interface including the active feed, wherein the graphical user interface is displayed on a display device of a client device used by an active user that is connected to the social networking system, and wherein the client device is coupled to the second server.

9. The system of claim 6 wherein to update a view of active feed to include the information update is performed without receiving a request for the information update from a client device of a user of the social networking system.

10. The system of claim 6, wherein the representation of the information update is a cache key that is used to retrieve the information update from a cache.

11. A non-transitory computer-readable storage medium storing instructions that, when executed by a processor of a server, to perform operations comprising:

in response to an occurrence of an information update that relates to a feed in a social networking system that is implemented on a plurality of servers, wherein each one of a plurality of users accesses the social networking system through a client device from a plurality of client devices, performing the following:

transmitting, from a first server from the plurality of servers, a representation of the information update to other servers from the plurality of servers, wherein each one of the other servers is coupled with a respective distinct subset of client devices from the plurality of client devices, determining, at a second server from the other servers, for the information update a subset of active feeds from a plurality of active feeds, the subset of the active feeds being less than the plurality of feeds, wherein the determining includes determining the users of client devices that are coupled to the second server for push notifications, wherein at the moment of occurrence of the information update the users are logged-in to the social networking system and viewing a feed or a stream through a graphical user interface of the social networking system, and for an active feed from the subset of active feeds, update a view of the active feed to include the information update.

12. The non-transitory computer-readable storage medium of claim 11, wherein determining, at the second server from the other servers, the subset of active feeds includes:

determining a query plan;

transmitting the query plan including the rules that define the feeds for the information update; and receiving the subset of active feeds.

13. The non-transitory computer-readable storage medium of claim 11, wherein updating a view of the active feed to include the information update includes causing display of the information update as part of a graphical user interface including the active feed, wherein the graphical user interface is displayed on a display device of a client device used by an active user that is connected to the social networking system, and wherein the client device is coupled to the second server.

14. The non-transitory computer-readable storage medium of claim 11, wherein updating a view of the active feed to include the information update is performed without receiving a request for the information update from a client device of a user of the social networking system.

15. The non-transitory computer-readable storage medium of claim 11, wherein the representation of the information update is a cache key that is used to retrieve the information update from a cache.

* * * * *